United States Patent [10] Patent No.: US 8,140,615 B2
Miller et al. (45) Date of Patent: Mar. 20, 2012

(54) CONSOLIDATED BUSINESS SERVICE FOR INTEGRATING SERVICE ORIENTED ARCHITECTURE SERVICES WITH CUSTOMER RESOURCES

(75) Inventors: Landon C. G. Miller, Tuscaloosa, AL (US); Siljan H. Simpson, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/116,434

(22) Filed: May 7, 2008

(65) Prior Publication Data

US 2009/0281861 A1 Nov. 12, 2009

(51) Int. Cl.
*G06F 15/16* (2006.01)
*G06F 17/00* (2006.01)
(52) U.S. Cl. ............. 709/202; 709/229; 706/11; 706/47
(58) Field of Classification Search .................. 709/229; 705/8
See application file for complete search history.

(56) References Cited

U.S. PATENT DOCUMENTS

| 2004/0122972 | A1* | 6/2004 | Gibson et al. | 709/236 |
| 2005/0080873 | A1* | 4/2005 | Joseph | 709/217 |
| 2005/0216555 | A1* | 9/2005 | English et al. | 709/204 |
| 2006/0271563 | A1* | 11/2006 | Angelo et al. | 707/100 |
| 2008/0091448 | A1* | 4/2008 | Niheu et al. | 705/1 |
| 2008/0301757 | A1* | 12/2008 | Demarest et al. | 726/1 |
| 2009/0254392 | A1* | 10/2009 | Zander | 705/7 |

* cited by examiner

*Primary Examiner* — Wing Chan
*Assistant Examiner* — David X Yi
(74) *Attorney, Agent, or Firm* — John R. Pivnichny; Law Office of Jim Boice

(57) ABSTRACT

A Consolidated Business Service (CBS) manages an interface between Service Oriented Architecture (SOA) services and resources used by at least one enterprise customer. The CBS utilizes an Enterprise Systems Management (ESM) layer that includes: a bi-directional portal between Service Oriented Architecture (SOA) services and enterprise resources used by at least one enterprise customer; an aggregating logic for aggregating incoming and outgoing messages from the SOA services and the enterprise resources; a strategy set of rules that define pre-set responses to an event described by one or more of the incoming messages from the enterprise resources, wherein the pre-set responses are provided by a SOA response service from the SOA services; and a delegation logic for delegating the pre-set responses to agents in the affected resources, wherein the agents are software logic that have been pre-deployed, from the ESM layer to the affected resources, for executing the pre-set responses.

19 Claims, 9 Drawing Sheets

CONSOLIDATED BUSINESS SERVICE FOR INTEGRATING SERVICE ORIENTED ARCHITECTURE SERVICES WITH CUSTOMER RESOURCES

BACKGROUND OF THE INVENTION

1. Technical Field

The present disclosure relates in general to the field of computers, and more particularly to the computer systems. Still more particularly, the present disclosure relates to Service Oriented Architecture (SOA) services utilized by computer systems.

2. Description of the Related Art

A Service Oriented Architecture (SOA) can be viewed as a computer system architecture in which business processes, packaged as software services, can be created and reused by a client enterprise.

Enterprises, both commercial, non-commercial and governmental, typically have different systems for auditing, controlling and directing various Information Technology (IT) functional units. Such IT functional units include, but are not limited to, data centers (where enterprise data is stored), call centers (where telephone and e-mail calls from customers are centrally handled by an enterprise or a third party administrator), network operations centers (where the networks which interconnect people and organizations are managed), security centers (for protecting computer networks and systems from digital attacks), auditing and control operations (which manage the risk and operational health, and oversee the functions\ing of an enterprise), data operations (where enterprise data is input, processed and managed), and application development (from which software code is conceived, written, debugged and deployed). Such IT functional units often utilize different protocols, including different operating systems, different software, different versions of software, different communication formats, etc.

Because of the disparity in system types found in the client enterprise, using SOA services is difficult, since there is little or no coordination and/or consolidation of events found in an enterprise. That is, a single resource in an enterprise may be able to request a particular SOA service, but there is no current process/system for coordinating the needs of multiple resources, which may be from different client enterprises and/or may utilize different protocols. Thus there is a need in the art for a coordinating entity in the enterprise that provides an integrating systems management function.

SUMMARY OF THE INVENTION

A Consolidated Business Service (CBS) manages an interface between Service Oriented Architecture (SOA) services and resources used by at least one enterprise customer. The CBS utilizes an Enterprise Systems Management (ESM) layer that includes: a bi-directional portal between Service Oriented Architecture (SOA) services and enterprise resources used by at least one enterprise customer; an aggregating logic for aggregating incoming and outgoing messages from the SOA services and the enterprise resources; a strategy set of rules that define pre-set responses to an event described by one or more of the incoming messages from the enterprise resources, wherein the pre-set responses are provided by a SOA response service from the SOA services; and a delegation logic for delegating the pre-set responses to agents in the affected resources and elements of hardware that such agents directly or indirectly control or sense operationally important status from, wherein the agents are software logic that have been pre-deployed, from the ESM layer to the affected resources, for executing the pre-set responses.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
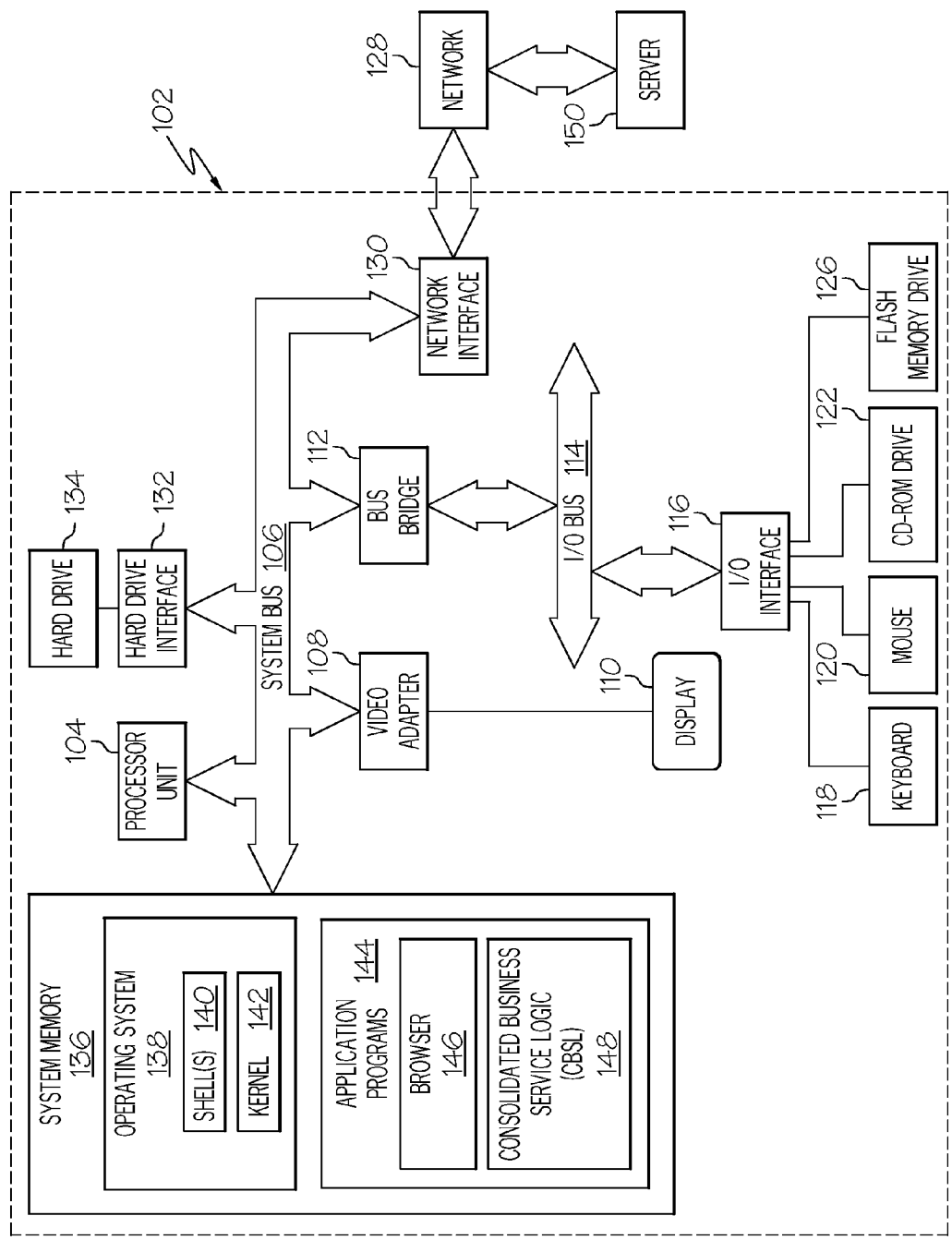
FIG. 1 illustrates an exemplary computer in which the present invention may be utilized.

With reference now to FIG. 1, there is depicted a block diagram of an exemplary computer 102, in which the present invention may be utilized. Note that some or all of the exemplary architecture shown for computer 102 may be utilized by software deploying server 150, as well as by Service Oriented Architecture (SOA) server 202, Consolidated Business Service (CBS) server 204, enterprise resources 206a-n, call center 208, data center 210, help desk 212 shown in FIG. 2, and/or client computer 404 shown in FIG. 4. Similarly, the architecture shown for computer 102 can be utilized to support other software and processes described in FIGS. 2-7B.

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include an Consolidated Business Service Logic (CBSL) 148. CBSL 148 includes code for implementing the processes described in FIGS. 2-7B. In one embodiment, computer 102 is able to download CBSL 148 from software deploying server 150, including in an "on demand" basis, as described in greater detail below in FIGS. 6A-7B.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
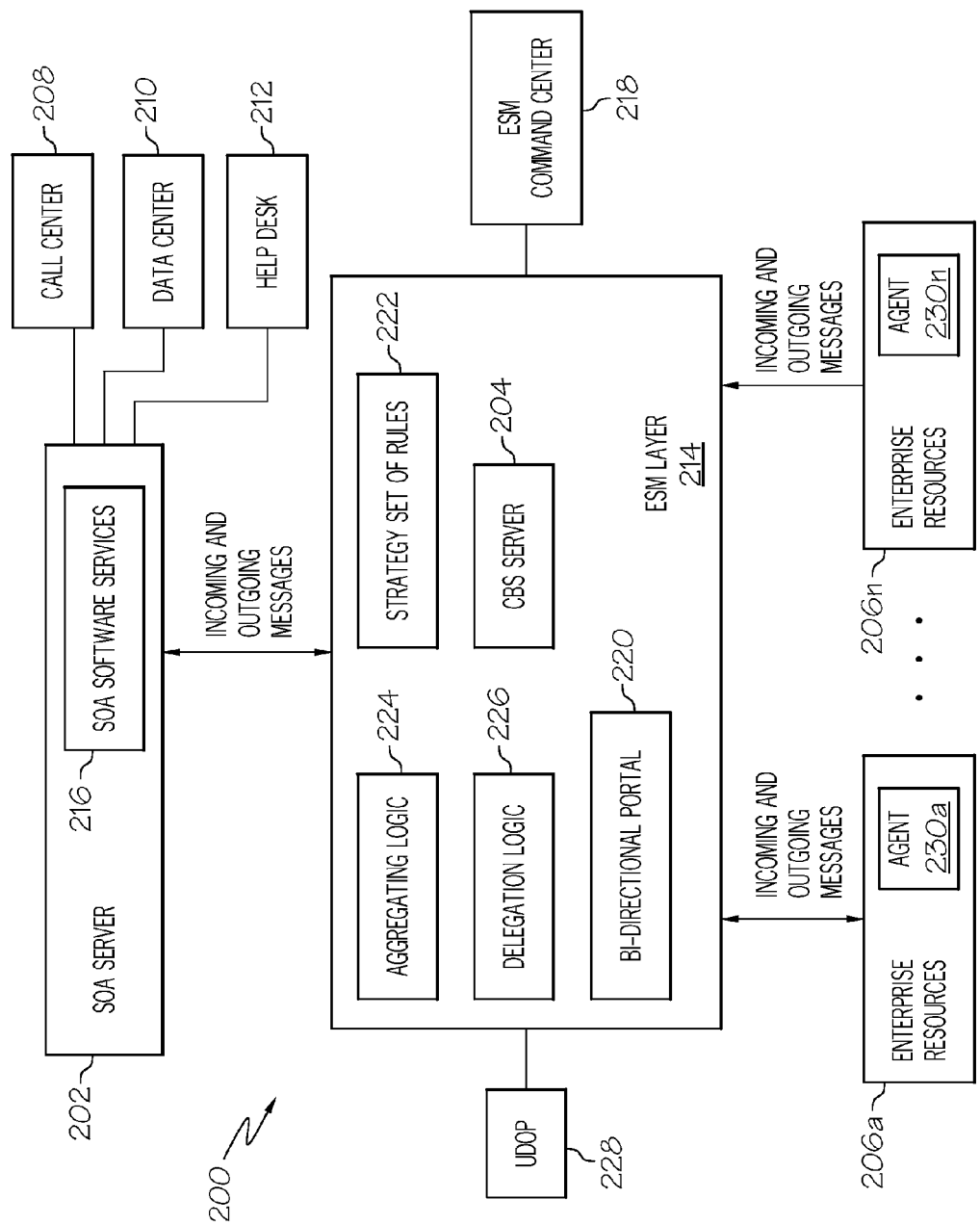
FIG. 2 depicts an exemplary Consolidated Business Service (CBS) for managing an interface between Service Oriented Architecture (SOA) services and customer resources.

With reference now to FIG. 2, an exemplary overview of a Consolidated Business Service (CBS) 200 is presented. CBS 200 includes a novel software layer referred to here as an Enterprise Systems Management (ESM) layer 214. ESM layer 214 is a Service Oriented Architecture (SOA) self-contained network that manages and integrates processes provided by SOA software services 216 to enterprise resources 206a-n (where "n" is an integer). Note that enterprise resources 206a-n may be from a same enterprise, or they may be from different enterprises. Note also that resources 206a-n may utilize different protocols, including but not limited to, different operating systems, different software applications, different versions of a same software title, different communication protocols (both internal as well as external), etc. As described below, ESM layer 214 provides pervasive command and control over activities across the enterprise resources 206a-n.

Within the ESM layer 214, which may be run on the CBS server 204 (as depicted and managed by an ESM command center 218) or alternatively by the SOA server 202, is a bi-directional portal 220, a strategy set of rules 222, an aggregating logic 224, and a delegation logic 226.

Bi-directional portal 220 provides an interface for incoming and outgoing messages between the SOA software services 216 and the enterprise resources 206a-n. In some instances, the enterprise resources 206a-n utilize a format that is unintelligible to the SOA software services 216. For example, one of the enterprise resources 206a-n may utilize an operating system, application program (or version thereof), data format (voice, data, video, etc.), etc. that is not understood and/or supported by any of the SOA software services 216. Thus, bi-directional portal 220 may include logic for translating, preferably by using Extensible Markup Language (XML) code, incoming messages from one or more of the enterprise resources 206a-n into a format that can be understood/handled/processed by one of the SOA software services 216.

The incoming messages from the enterprise resources 206a-n may be traps of events that occur within and/or are generated by the enterprise resources 206a-n. These events may be anomalies or normal events, and include, but are not limited to, video signals (e.g., camera feeds), voice signals (e.g., telephone calls), data signals (e.g., packeted data transmissions), Simple Mail Transfer Protocol (SMTP) alert messages (e.g., e-mail alerts warning of a problem within one or more of the enterprise resources 206a-n), Simple Network Management Protocol (SNMP) system alerts (e.g., network-based alerts warning of a problem within one or more of the enterprise resources 206a-n), handheld radio transmissions (e.g., "walkie-talkie" traffic that is locally captured by a repeater tower), and other protocols for voice data such as SNTP (Simple Network Time Protocol for data), and H.323 for voice protocols and systems alerts directly generated by agents that directly, or through additional electronic or optical circuitry, sense operational status and performance status, etc.

The strategy set of rules 222 manages operation of all activities within the ESM layer 214, and may define pre-set responses to an event described by one or more of the incoming messages from the enterprise resources. These pre-set responses are provided by one of the SOA software services 216, which may be referred to as an SOA response service (not separately depicted from SOA software services 216).

The aggregating logic 224 aggregates incoming messages from the enterprise resources 206a-n in accordance with rules found in the strategy set of rules 222. This aggregation both aggregates and de-duplicates incoming messages. For example, aggregating logic 224 may "know" that an event is significant only if it occurs more than a pre-determined number of times from a previously identified one or more resource (from the enterprise resources 206a-n) within a predetermined time period. Similarly, if a same event is detected and reported by multiple resources (from the enterprise resources 206a-n), then the aggregating logic 224 utilizes logic (from the strategy set of rules 222) that identifies these multiple reports as being for a same single event (e.g., multiple cameras, having different viewpoints, picking up a same object/person in their fields of view).

The delegation logic 226 delegates the pre-set responses to agents 230a-n, which are located (respectively) in the enterprise resources 206a-n. These agents 230a-n have been pre-deployed to the enterprise resources 206a-n from the ESM layer 214, and may be responsible for actually allocating the pre-set response to their local enterprise resource.

ESM layer 214 also supports at least one User Defined Operating Picture (UDOP) 228. The UDOP 228 is user-configured to permit a user to select one or more of the enterprise resources 206a-n for viewing alarms, activities, etc. Note that the UDOP 228 is not merely a dashboard, but rather provides the user with sufficient granularity to view specific activities within a particular resource from the enterprise resources 206a-n. For example, the UDOP 228 may be a heat map of multiple (user-selected) resources from the enterprise resources 206a-n. This heat map is a color coded representation that shows levels of activity (either nominal or anomalous) occurring in real-time within the viewed resources. If a particular resources shows unusually high activity (as represented by a changed in color, such as from green to yellow or red), the user can "drill down" into the resource's activities to determine the cause of the increased activity.

Figure 3:
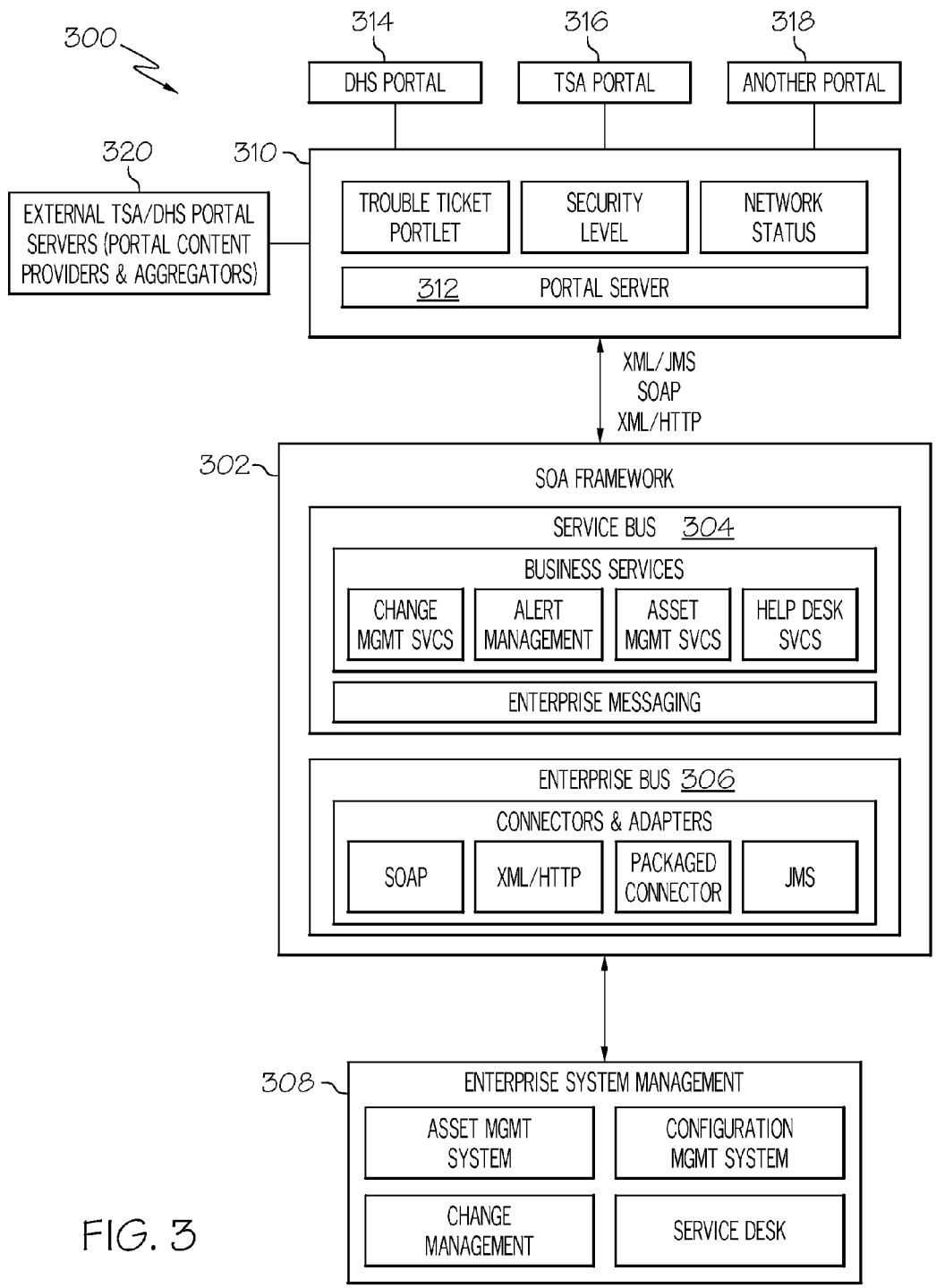
FIG. 3 illustrates an alternate architecture for the CBS shown in FIG. 2.

With reference now to FIG. 3, an alternate perspective of the architecture of the CBS 200, shown in FIG. 2, is presented as CBS 300. CBS 300 includes a SOA framework 302, which includes a service bus 304 and an enterprise bus 306. The service bus 304 handles business services (e.g., services for changing management of the SOA, handling alerts, managing assets of customer enterprises, handling a help desk, etc.) as well as receiving messages (e.g., the incoming messages shown in FIG. 2) from enterprise resources. The enterprise bus 306 includes necessary connectors and adapters for handling messages in SOAP (originally named as a "Simple Object Access Protocol", now simply known as "SOAP"), XML/Hypertext Transfer Protocol (XML/HTTP), packaged connectors (e.g., Internet Protocol/Transmission Control Protocol (IP/TCP) packets), Java Message Services (JMS), and other messaging protocols of the like).

The SOA framework 302 receives and transmits messages to an enterprise systems management 308, which includes resources (e.g., enterprise resources 206a-n shown in FIG. 2), which may include systems for asset management, making changes to the resources, configuring the resources, a service desk for supporting usage of the resources, etc.). In one embodiment, the enterprise system management 308 is staffed/handled by a SOA service that is managed by the CBS 200 described above.

The SOA framework 302 is also able to communicate and provide enterprise information views 310, which are similar to the UDOP 228 described in FIG. 2. These enterprise information views 310 are managed by a portal server 312, and provide a display of view such as a trouble ticket portlet, definitions of security levels (e.g., the five national security threat levels/colors defined by the U.S. Department of Homeland Security—DHS), network element, security element, and network circuit element status, etc. Information that populates (and may be "drilled down" for further analysis) such view may come from multiple portals. For example, a Department of Homeland Security (DHS) portal 314, a Transportation Safety Administration (TSA) portal 316, and another portal 318 may be provided by outside servers, including external TSA/DHS portal servers 320. Such a scenario enables the example shown in FIG. 4.

Figure 4:
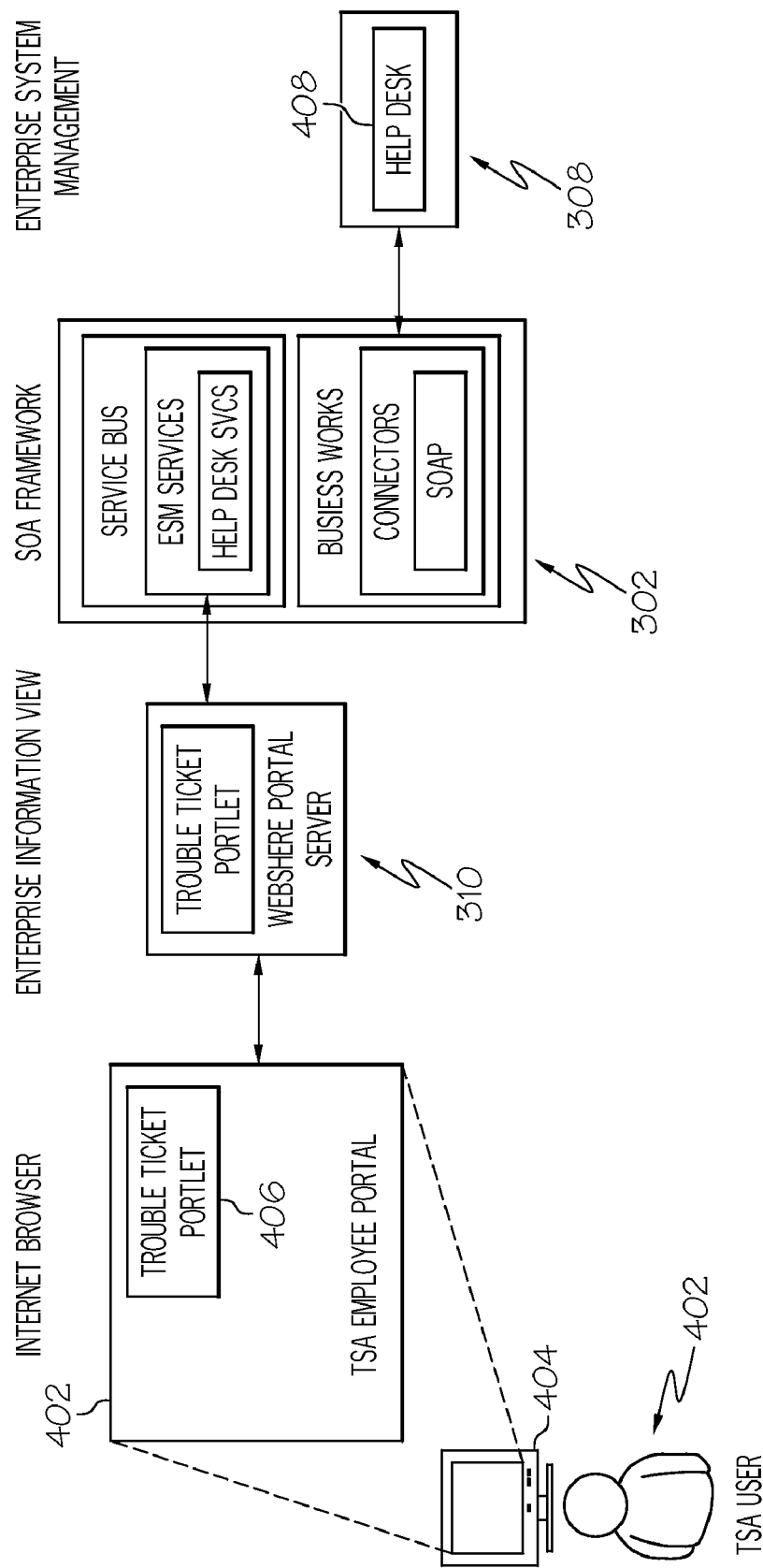
FIG. 4 depicts an exemplary use of the CBS shown in FIG. 2 and FIG. 3 for handling a trouble ticket that has been generated by a SOA client.

Referring now to FIG. 4, assume that a user 402 is, for example, a TSA employee who is monitoring a TSA employee portal 402 on his client computer 404. A trouble ticket portlet 406 may indicate a local problem, such as a detection of radiation in a bagging screening machine (not shown). This trouble ticket portlet 406 was activated by the enterprise information views 310 under the guidance of the SOA framework 302 described in FIG. 3. The TSA user 402 is not alone, however, and may contact a help desk 408 from the enterprise system management 308. This help desk may provide further information and assistance, including simply resetting the trouble ticket portlet if the user 402 and/or an assistant at the help desk 408 determine that the trouble ticket is insignificant.

Figure 5:
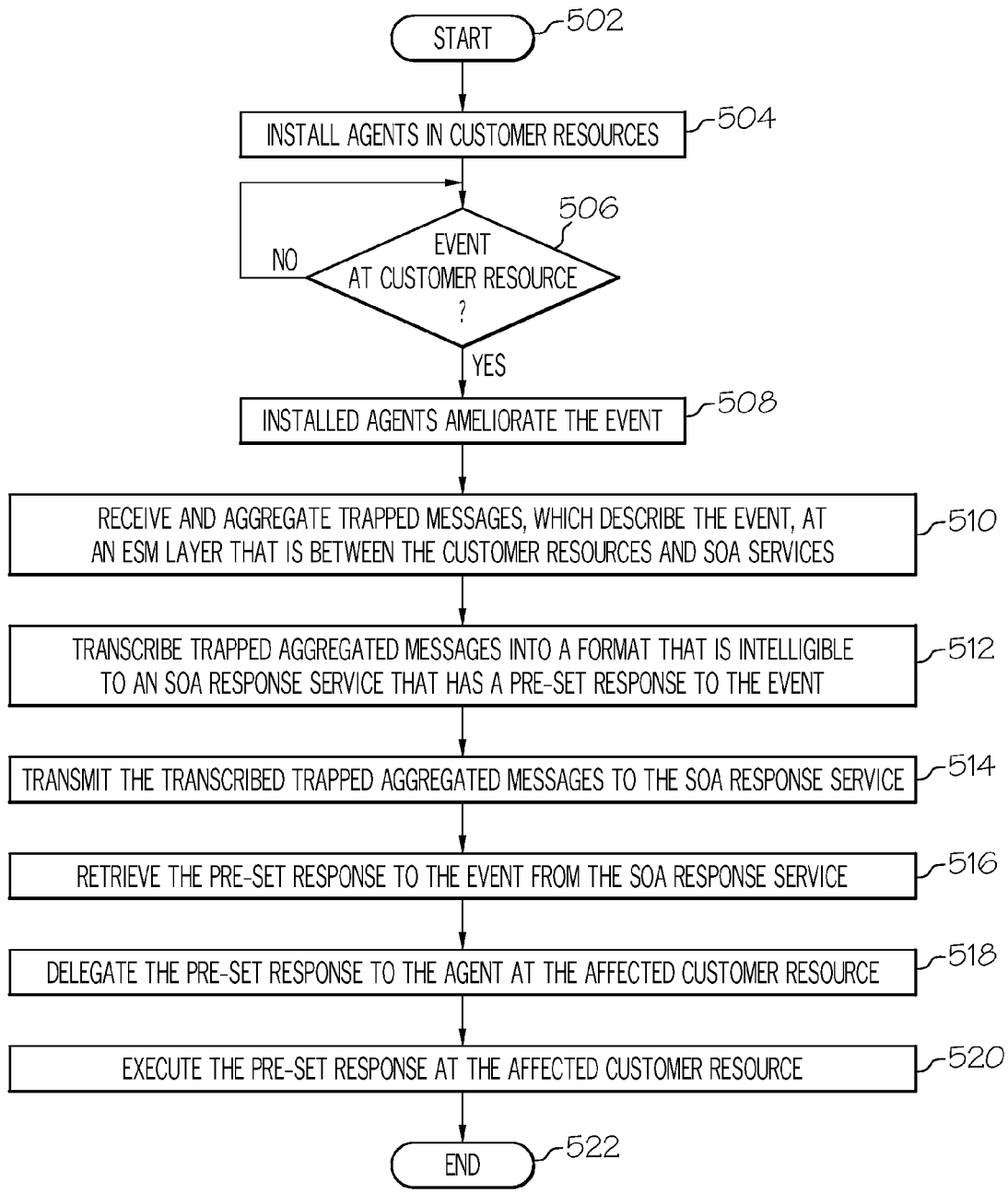
FIG. 5 is a high-level flow chart of exemplary steps taken to provide an integration of SOA services with client resources.

Referring now to FIG. 5, presented are an exemplary set of steps taken to integrate Service Oriented Architecture (SOA) services with resources at multiple enterprises, where at least one of the resources at the multiple enterprises has at least one incompatible feature that is incompatible with another resource from the multiple enterprises. After initiator block 502, at least one agent is installed, by an Enterprise Systems Management (ESM) layer, in at least one of the resources at the multiple enterprises (block 504). Note that the ESM layer is logically oriented between Service Oriented Architecture (SOA) services and the resources at the multiple enterprises. In response to detecting an event at an affected resource from the resources at the multiple enterprises (query block 506), the event is ameliorated by a local agent in the affected resource (block 508). For example, if the event is a viral attack on the resource, then the installed agent may shut down (or close a port to) the affected (infected) resource.

Trapped messages are received and aggregated in the ESM layer, which creates trapped aggregated messages from the trapped messages (block 510). These trapped messages describe the event that occurred in the affected resource, and may be anomalous (e.g., a virus, a lock-up, an overuse, etc.) or nominal (e.g., normal data, video, voice traffic). As described in block 512, the ESM layer transcribes the trapped aggregated message to create a transcribed trapped aggregated message. Note that the trapped aggregated message is initially in a first format that is unintelligible to an SOA response service that has a pre-set response to the event, and that the transcribed trapped aggregated message is in a second format that is intelligible to the SOA response service that has the pre-set response to the event.

As depicted in block 514, the transcribed trapped aggregated message is then transmitted, from the ESM layer, to the SOA response service to request the pre-set response. The ESM layer retrieves the pre-set response from the SOA response service (block 516), and delegates the pre-set response from the ESM layer to the local agent in the affected resource (block 518). The local agent then executes the pre-set response at the affected resource (block 520), and the process ends (terminator block 522).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of CBSL 148, are performed by service provider server 150. Alternatively, CBSL 148 and the method described herein, and in particular as shown and described in FIGS. 2-5, can be deployed as a process software from service provider server 150 to computer 102. Still more particularly, process software for the method so described may be deployed to service provider server 150 by another service provider server (not shown).

Figure 6A:
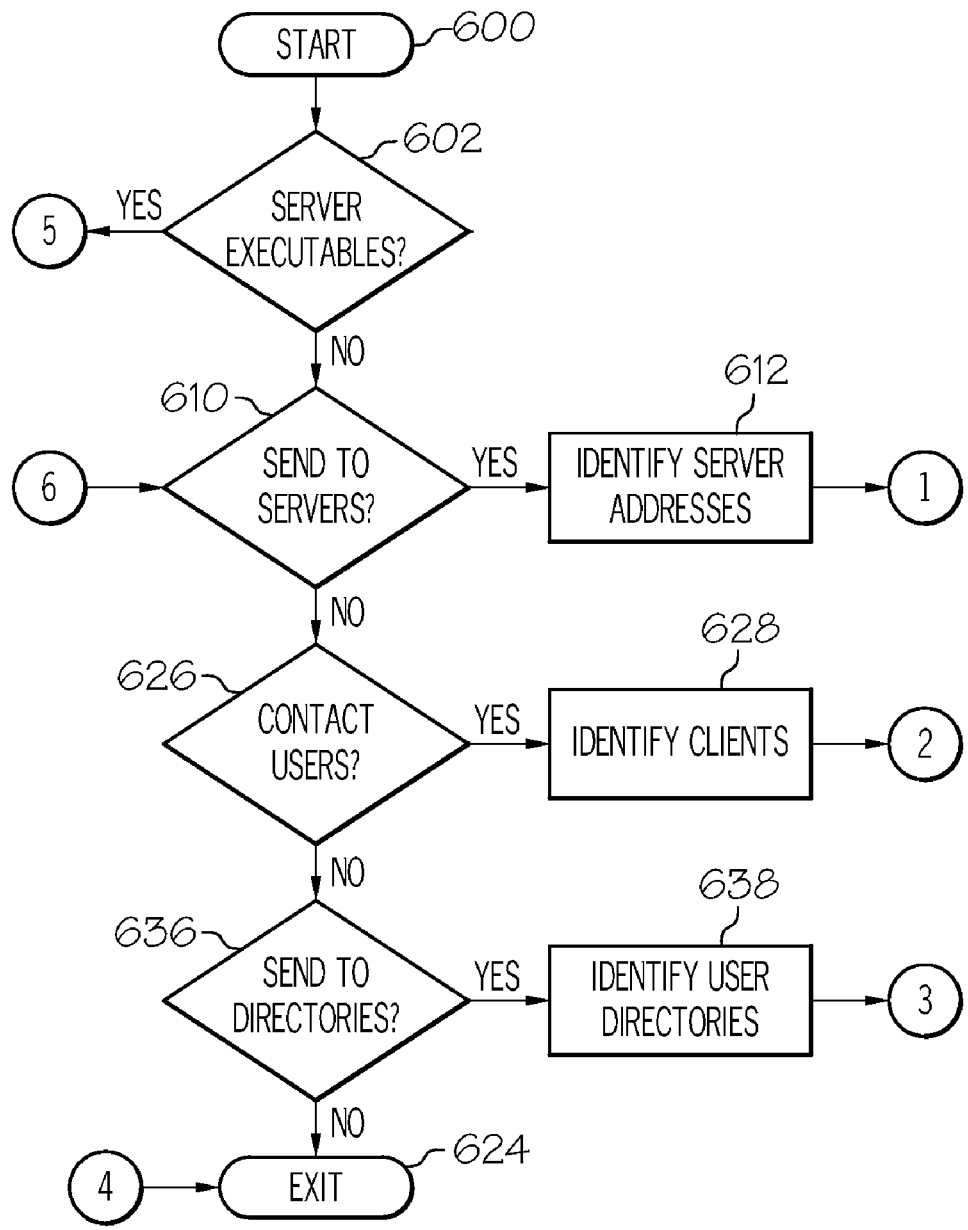
FIGS. 6A-B are flow-charts showing steps taken to deploy software capable of executing the steps and processes described in FIGS. 2-5.
Figure 6B:
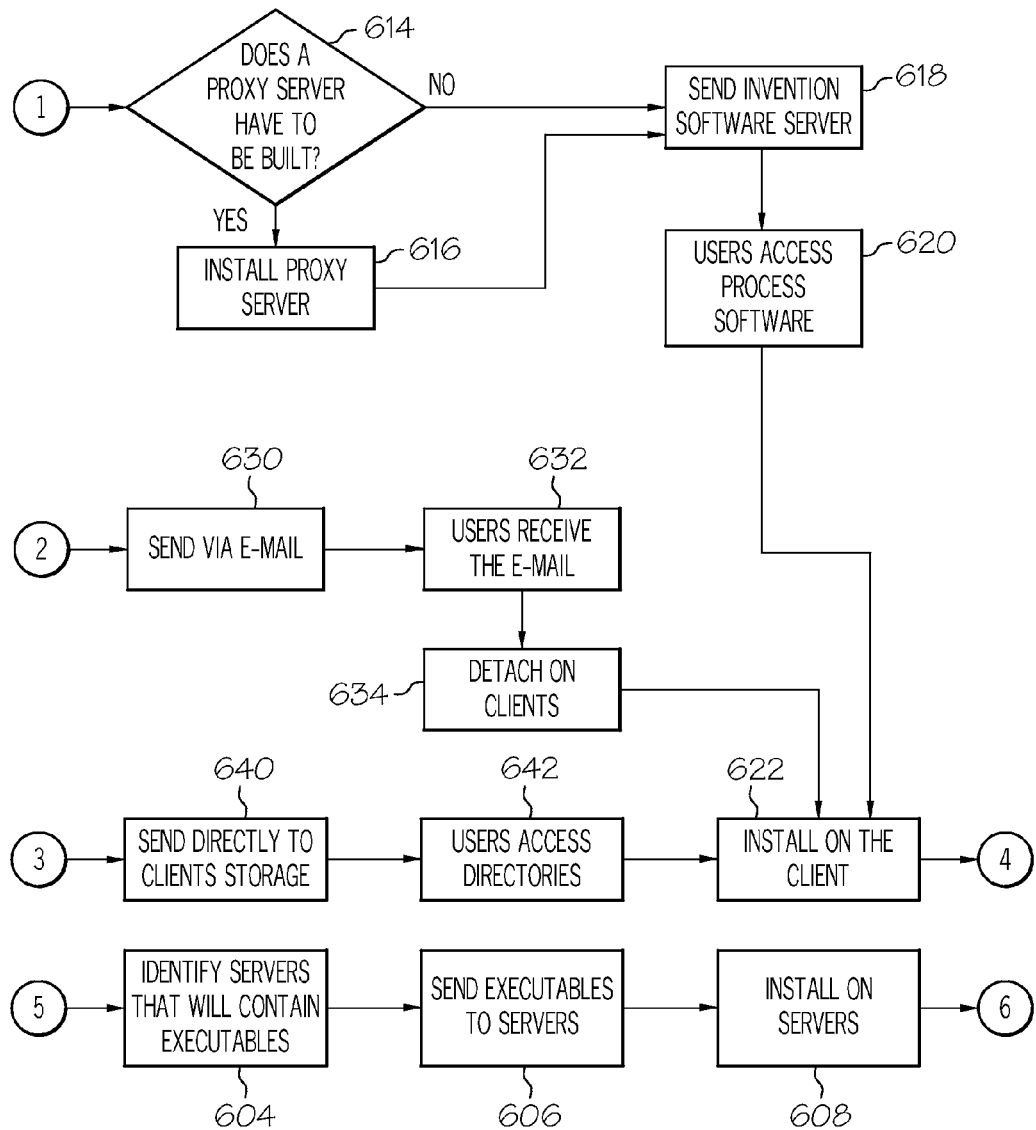

Referring then to FIGS. 6A-B, step 600 begins the deployment, also called provisioning, of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made as to whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users, or software that automates the installation of the then transferred software, access the directories on their client file systems in preparation for installing the process software (block 642). The user or the installation automation software then executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
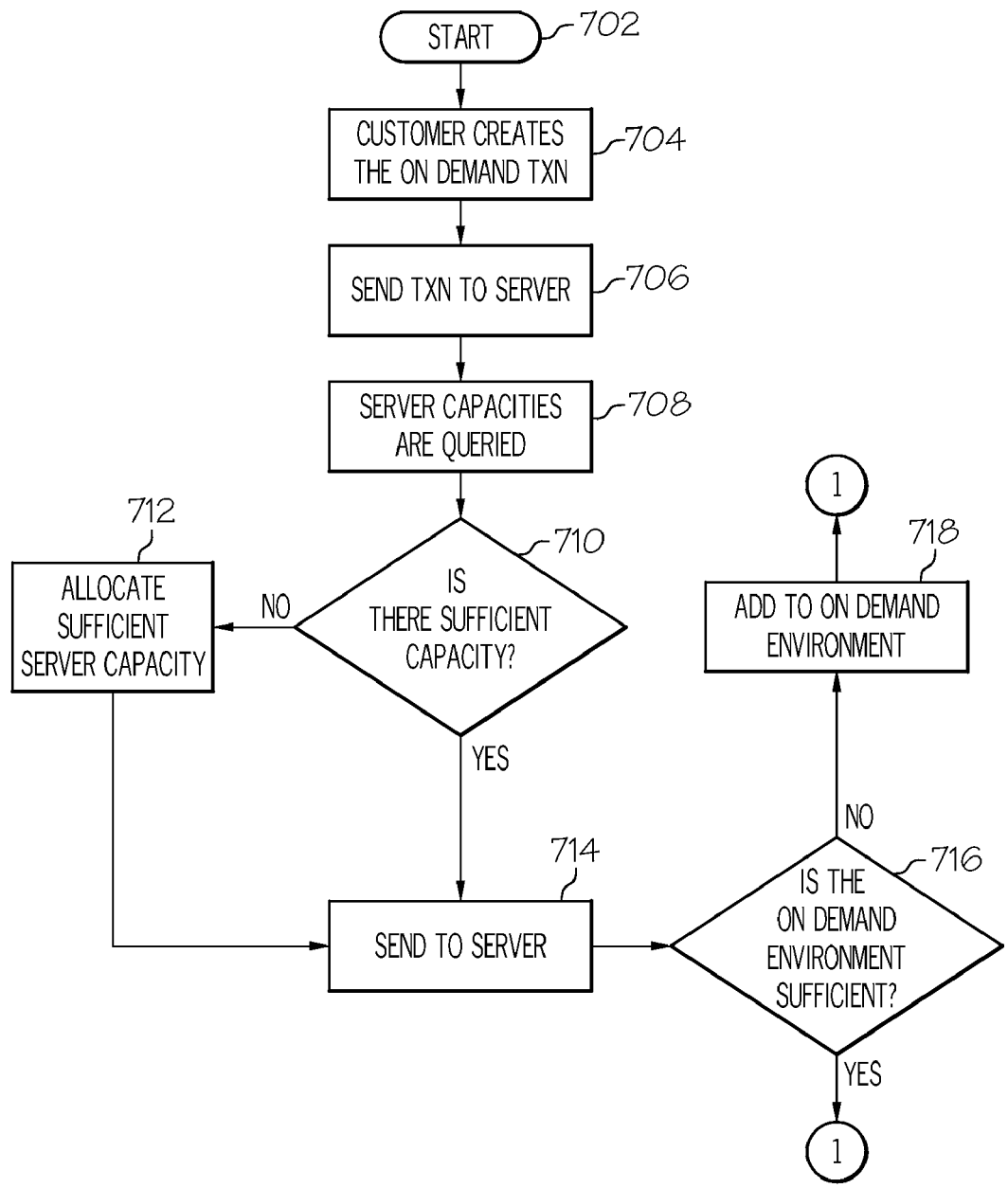
FIGS. 7A-B are flow-charts showing steps taken to execute the steps and processes shown in FIGS. 2-5 using an on-demand service provider.
Figure 7B:
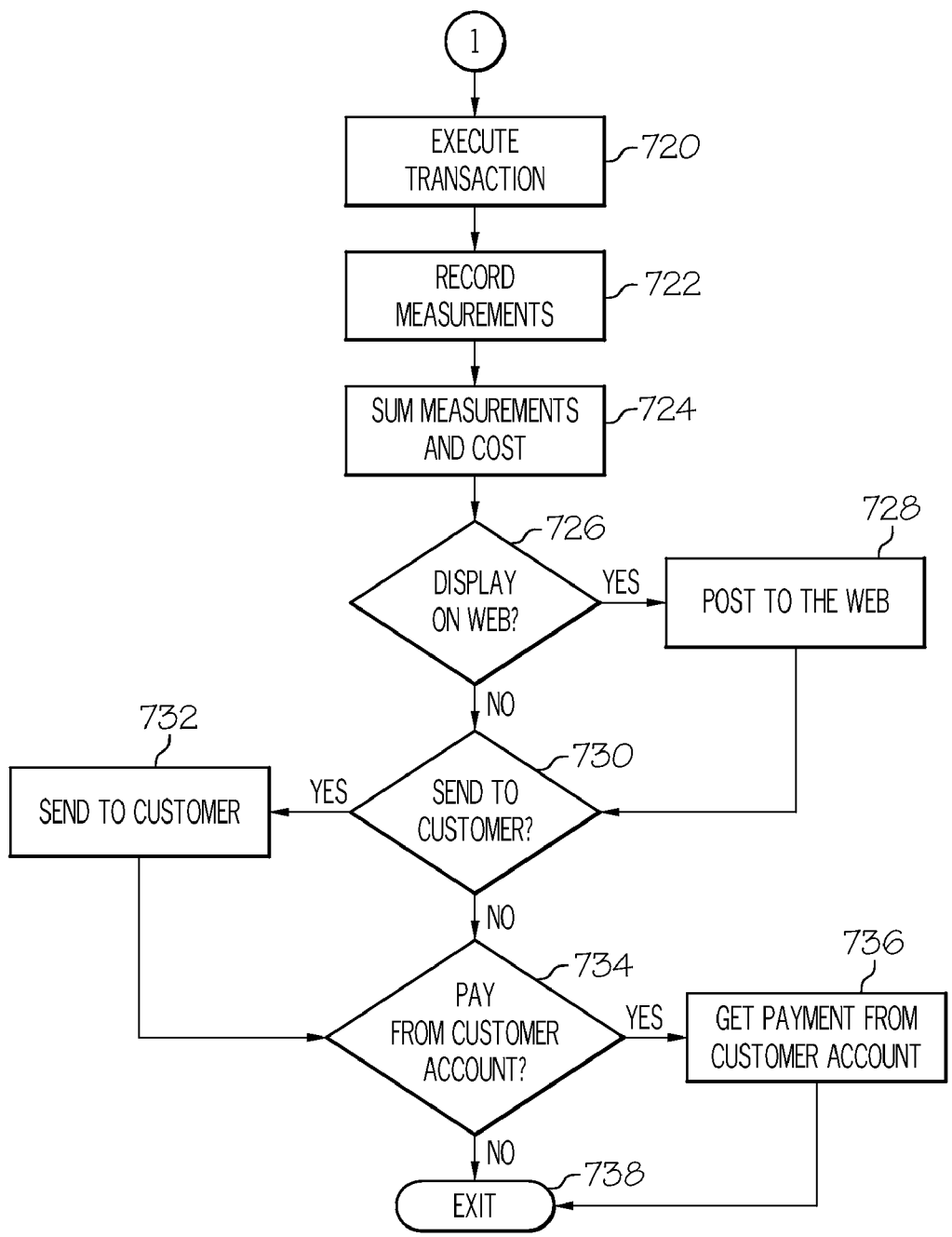

With reference now to FIGS. 7A-B, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the server's available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer system comprising:
    a processor, a computer readable memory, and a computer readable storage device;
    first program instructions to install, via an Enterprise Systems Management (ESM) layer, at least one agent in at least one of resources at multiple enterprises, wherein the ESM layer is logically oriented between Service Oriented Architecture (SOA) services and the resources at the multiple enterprises:
    second program instructions to, in response to detecting an event at an affected resource from the resources at the multiple enterprises, ameliorate the event by a local agent in the affected resource;
    third program instructions to receive and aggregate, at the ESM layer, trapped messages from the affected resource that describe the event to create a trapped aggregated message, wherein the trapped messages are aggregated to describe redundant messages that describe a same event, and wherein the redundant messages are generated by multiple resources, from the multiple enterprises, detecting and reporting the same event;
    fourth program instructions to transcribe, at the ESM layer, the trapped aggregated message to create a transcribed trapped aggregated message, wherein the trapped aggregated message is in a first format that is unintelligible to an SOA response service that has a pre-set response to the event, and wherein the transcribed trapped aggregated message is in a second format that is intelligible to the SOA response service that has the pre-set response to the event, and wherein the first format is unintelligible to the SOA response service due to the resources at the multiple enterprises utilizing operating systems, application programs, and data formats that are not supported by the SOA response service;
    fifth program instructions to transmit the transcribed trapped aggregated message to the SOA response service to request the pre-set response;
    sixth program instructions to retrieve, by the ESM layer, the pre-set response from the SOA response service;
    seventh program instructions to delegate the pre-set response from the ESM layer to the local agent in the affected resource; and
    eighth program instructions to translate the pre-set response into a protocol needed to initiate the pre-set response in an electronic element addressed by the pre-set response, and execute the pre-set response at the affected resource; and wherein the first, second, third, fourth, fifth, sixth, seventh and eighth program instructions are stored on the computer readable storage device for execution by the processor via the computer readable memory.

2. The system of claim 1, wherein incoming and outgoing messages between the SOA services and the resources at the multiple enterprises are modified by a bi-directional portal using Extensible Markup Language (XML) code, and wherein the XML code modifies the incoming and outgoing messages in a manner that permits the SOA services and the resources at the multiple enterprises to communicate with each other via the ESM layer.

3. The system of claim 1, wherein the trapped messages from the affected resource are traps of at least one of video signals, voice signals, data signals, Simple Mail Transfer Protocol (SMTP) alert messages that describe faults in one or more of the affected resource, Simple Network Management Protocol (SNMP) system alert e-mail messages that describe faults in one or more of the affected resource, device fault alerts that were sent using combined data and voice device messaging protocols, and handheld radio transmissions, and wherein the traps describe overuse of the affected resource.

4. The system of claim 1, wherein the trapped messages from the affected resource are traps of video signals generated by the affected resource, and wherein the traps describe only nominal video traffic from the affected resource.

5. The system of claim 1, wherein the trapped messages from the affected resource are traps of voice telephone signals generated by the affected resource, and wherein the traps describe only nominal voice traffic from the affected resource.

6. The system of claim 1, wherein the trapped messages from the affected resource are traps of data signals from a computer from the affected resource, and wherein the traps describe overuse of the affected resource.

7. The system of claim 1, wherein the trapped messages from the affected resource are traps of Simple Mail Transfer Protocol (SMTP) system alert e-mail messages that describe errors in the affected resource.

8. The system of claim 1, further comprising:
    a user computer that comprises a portal, wherein the portal provides a view to a trouble ticket from the SOA services, wherein the portal is populated by information from outside servers, and wherein the information is accessible through the portal.

9. The system of claim 1, wherein the trapped messages from the affected resource are traps of handheld radio transmissions from the affected resource.

10. The system of claim 1, wherein the ESM layer further comprises a User Defined Operating Picture (UDOP), wherein the UDOP is user-configured to permit a user to select one of the resources of the multiple enterprises as a selected resource, wherein the UDOP permits the user to view alarm data for the selected resource, wherein the alarm data describes a cause of an anomaly in the selected resource.

11. The system of claim 10, wherein the UDOP displays a heat map that describes an anomaly frequency of the anomaly in the selected resource.

12. A computer-implemented method for integrating Service Oriented Architecture (SOA) services with resources at multiple enterprises, wherein at least one of the resources at the multiple enterprises has at least one incompatible feature that is incompatible with another resource from the multiple enterprises, the computer-implemented method comprising:
    installing, by an Enterprise Systems Management (ESM) layer, at least one agent in at least one of the resources at the multiple enterprises, wherein the ESM layer is logically oriented between Service Oriented Architecture (SOA) services and the resources at the multiple enterprises:

in response to detecting an event at an affected resource from the resources at the multiple enterprises, ameliorating the event by a local agent in the affected resource;

receiving and aggregating, at the ESM layer, trapped messages from the affected resource that describes the event to create a trapped aggregated message, wherein the trapped messages are aggregated to describe redundant messages that describe a same event, and wherein the redundant messages are generated by multiple resources, from the multiple enterprises, detecting and reporting the same event;

transcribing, at the ESM layer, the trapped aggregated message to create a transcribed trapped aggregated message, wherein the trapped aggregated message is in a first format that is unintelligible to an SOA response service that has a pre-set response to the event, and wherein the transcribed trapped aggregated message is in a second format that is intelligible to the SOA response service that has the pre-set response to the event, and wherein the first format is unintelligible to the SOA response service due to the resources at the multiple enterprises utilizing operating systems, application programs, and data formats that are not supported by the SOA response service;

transmitting the transcribed trapped aggregated message to the SOA response service to request the pre-set response;

retrieving, by the ESM layer, the pre-set response from the SOA response service;

delegating the pre-set response from the ESM layer to the local agent in the affected resource;

translating the pre-set response into a protocol needed to initiate the pre-set response in an electronic element addressed by the pre-set response; and executing the pre-set response at the affected resource.

13. The computer implemented method of claim 12, wherein the trapped messages describe only nominal radio transmissions from held-held radios, wherein the hand-held radios are from the enterprise resources.

14. The computer implemented method of claim 12, further comprising:

displaying information from the trapped messages on a User Defined Operating Picture (UDOP), wherein the UDOP is user-configured to permit a user to select one of the enterprise resources as a selected resource, wherein the UDOP permits the user to view alarm data for the selected resource, wherein the alarm data describes a cause of an anomaly in the selected resource.

15. A computer-readable storage device encoded with a computer program, the computer program comprising computer executable instructions executed by a computer processor configured for:

installing, by an Enterprise Systems Management (ESM) layer, at least one agent in at least one of the resources at the multiple enterprises, wherein the ESM layer is logically oriented between Service Oriented Architecture (SOA) services and the resources at the multiple enterprises:

in response to detecting an event at an affected resource from the resources at the multiple enterprises, ameliorating the event by a local agent in the affected resource;

receiving and aggregating, at the ESM layer, trapped messages from the affected resource that describes the event to create a trapped aggregated message, wherein the trapped aggregated message describes redundant messages that describe a same event, and wherein the redundant messages are generated by multiple resources, from the multiple enterprises, detecting and reporting the same event;

transcribing, at the ESM layer, the trapped aggregated message to create a transcribed trapped aggregated message, wherein the trapped aggregated message is in a first format that is unintelligible to an SOA response service that has a pre-set response to the event, and wherein the transcribed trapped aggregated message is in a second format that is intelligible to the SOA response service that has the pre-set response to the event, and wherein the first format is unintelligible to the SOA response service due to the resources at the multiple enterprises utilizing operating systems, application programs, and data formats that are not supported by the SOA response service;

transmitting the transcribed trapped aggregated message to the SOA response service to request the pre-set response;

retrieving, by the ESM layer, the pre-set response from the SOA response service;

delegating the pre-set response from the ESM layer to the local agent in the affected resource;

translating the pre-set response into a protocol needed to initiate the pre-set response in an electronic element addressed by the pre-set response; and executing the pre-set response at the affected resource.

16. The computer-readable storage device of claim 15, wherein the trapped messages describe multiple depictions of a same event captured by multiple cameras from the enterprise resources, and wherein the trapped aggregated message describes the same event as a single event.

17. The computer-readable storage device of claim 15, wherein the computer executable instructions are further configured for:

displaying information from the trapped messages on a User Defined Operating Picture (UDOP), wherein the UDOP is user-configured to permit a user to select one of the enterprise resources as a selected resource, wherein the UDOP permits the user to view alarm data for the selected resource, wherein the alarm data describes a cause of an anomaly in the selected resource.

18. The computer-readable storage device of claim 15, wherein the computer-readable storage device is a component of a remote server, and wherein the computer executable instructions are deployable to a supervisory computer from the remote server.

19. The computer-readable storage device of claim 15, wherein the computer executable instructions are capable of being provided by a service provider to a customer on an on-demand basis.

* * * * *